United States Patent
Merli et al.

(10) Patent No.: US 8,932,997 B2
(45) Date of Patent: Jan. 13, 2015

(54) ANTI-ACCRETION AGENTS FOR DRILLING FLUIDS

(75) Inventors: Luigi Merli, Saronno (IT); Jacopo Franchini, Arese (IT); Pierangelo Pirovano, Comerio (IT); Mattia Ossola, Somma Lombardo (IT); Franco Federici, Busto Arsizio (IT); Dario Fornara, Novara (IT); Giuseppe Li Bassi, Gavirate (IT)

(73) Assignee: Lamberti SpA, Albizzate (VA) (IT)

( * ) Notice: Subject to any disclaimer, the term of this patent is extended or adjusted under 35 U.S.C. 154(b) by 484 days.

(21) Appl. No.: 12/993,648

(22) PCT Filed: May 18, 2009

(86) PCT No.: PCT/EP2009/056003
§ 371 (c)(1),
(2), (4) Date: Nov. 19, 2010

(87) PCT Pub. No.: WO2009/141308
PCT Pub. Date: Nov. 26, 2009

(65) Prior Publication Data
US 2011/0166048 A1  Jul. 7, 2011

(30) Foreign Application Priority Data
May 21, 2008  (IT) .............................. VA2008A0030

(51) Int. Cl.
*C09K 8/28* (2006.01)
*C09K 8/34* (2006.01)
*C09K 8/16* (2006.01)
*C09K 8/12* (2006.01)
*C09K 8/528* (2006.01)

(52) U.S. Cl.
CPC .. *C09K 8/12* (2013.01); *C09K 8/528* (2013.01)
USPC ............................. 507/131; 507/138; 507/139

(58) Field of Classification Search
USPC .......................................................... 507/131
See application file for complete search history.

(56) References Cited

U.S. PATENT DOCUMENTS

| 2,614,980 | A | * | 10/1952 | Lytle .............................. 507/244 |
| 4,458,757 | A | * | 7/1984 | Bock et al. .................... 166/267 |
| 5,605,879 | A |   | 2/1997 | Halliday et al. |
| 5,639,715 | A |   | 6/1997 | Patel |
| 6,803,346 | B1 |   | 10/2004 | Bailey et al. |
| 7,081,438 | B2 |   | 7/2006 | Horton |
| 2007/0082834 | A1 | * | 4/2007 | Hudson ......................... 510/407 |

* cited by examiner

*Primary Examiner* — Susannah Chung
*Assistant Examiner* — Atnaf Admasu
(74) *Attorney, Agent, or Firm* — Mossman, Kumar & Tyler, PC

(57) ABSTRACT

Esters of alkanolamines with unsaturated, polyunsaturated or saturated $C_8$-$C_{36}$ monocarboxylic acids are additives for reducing accretion on drilling equipment (anti-accretion agents) to be used in drilling muds during drilling and completion of oil and gas wells.

10 Claims, No Drawings

ANTI-ACCRETION AGENTS FOR DRILLING FLUIDS

FIELD OF THE INVENTION

The present invention relates to additives for reducing accretion on drilling equipment (anti-accretion agents) to be used in drilling muds during drilling and completion of oil and gas wells.

BACKGROUND OF THE ART

Drilling fluids, which are also called drilling muds, are complex mixtures of chemicals used in drilling operations for the production of hydrocarbons and natural gas from subterranean reservoirs.

Typically, oil and gas wells are drilled using drilling equipment in the presence of a drilling fluid.

Drilling fluids, generally comprising an emulsion or a solid suspension in a dispersing liquid phase, are pumped inside the drilling shaft and exit from the drilling bit through small openings.

The drilling fluids return to the surface through the small annulus between the outside of the drilling shaft and the bore hole wall.

Drilling muds perform a number of functions.

Exemplary of these functions are: cooling the drill bit; creating hydrostatic pressure to avoid uncontrolled blow outs and to help supporting the weight of the bore hole walls; acting as lubricant between the drilling bit and the bore hole walls; carrying drill cuttings up to the surface and suspending them when the fluid circulation is stopped.

Moreover, drilling fluids create a filter cake having low permeability on the bore hole walls and, in case, on the surface of the porous geological formations.

Drill cuttings may have the tendency to aggregate together in the drilling mud and to adhere on the drill string and casing; this phenomenon is often referred to as "accretion".

The accretion of the drill cuttings to the drill string and the casing impairs drilling operations and in the worst case can even result in drill string and drill pipe sticking.

It is therefore of the utmost importance to find methods for preventing accretion.

Several treatments have been attempted to solve these problems, including addition of surfactants, inorganic salts or lubricants to the drilling mud, but none of these additives has proved to fully satisfy the expectations.

Examples of anti-accretion agents can be found in:
U.S. Pat. No. 5,605,879, disclosing the use of synthetic polyalphaolefins;
U.S. Pat. No. 5,639,715, describing additives based on sulfosuccinate chemistry;
U.S. Pat. No. 6,803,346, describing additives based on phosphonate chemicals;
U.S. Pat. No. 7,081,438, reporting the use of phosphonates or phosphate esters of organic ligands.

A common problem which is encountered with the known anti-accretion agents is their possible toxicity to marine organisms and their poor biodegradability.

SUMMARY OF THE INVENTION

It has now been found that fatty acid esters of alkanolamines act as anti-accretion agents in drilling fluids and remedy many typical disadvantages of prior art additives.

The main object of the present invention is a water based drilling fluid containing from 0.05 to 10% by weight of a fatty acid esters of alkanolamines as anti-accretion agent.

Another object of the invention is a method for reducing accretion during oil and gas drilling operations, or in the subsequent completing or cementing operations of an oil or gas well, comprising the use of a water-based drilling fluid containing from 0.05 to 10% by weight of the above described anti-accretion agent.

DETAILED DESCRIPTION OF THE INVENTION

The fatty acids which are useful for the preparation of the esters of alkanolamines of the present invention are unsaturated, polyunsaturated or saturated $C_8$-$C_{36}$ monocarboxylic acids.

In particular, the fatty acid esters of alkanolamines that are useful as anti-accretion agents in drilling fluids are di- or tri-esters of di- or tri-tertiary alkanolamine, that may also be ethoxylated and/or propoxylated.

Suitable tertiary alkanolamines include, but are not limited to, triethanolamine, n-propanol diethanolamine, isopropanol diethanolamine, ethanol diisopropanolamine, tri-isopropanolamine, methyl diethanolamine, ethyl diethanolamine, their corresponding ethoxylated and/or propoxylated derivatives, and mixtures thereof.

The di- and tri-tertiary alkanolamines that are preferred for the preparation of the esters of the invention have the formula $$N(R^1)_n(R^2)_m(R^3)_o(R^4)_t \qquad (I)$$

wherein
$R^1$ is a $C_1$-$C_{36}$ linear or branched alkyl group,
n=0-1,
$R^2$, $R^3$, $R^4$ are independently $(CH_2CH(R^5)O)_s$—H with $R^5$ is H or $CH_3$
s=1-10
m+o+t=3-n
m,o,t=0-3.

Tertiary tri-alkanolamines of formula (I) wherein n=0, m=3, $R^2$ is $(CH_2CH(R^5)O)_s$—H with $R^5$=H and s=1-5, corresponding to triethanolamine and to ethoxylated triethanolamine, are particularly preferred.

Examples of unsaturated, polyunsaturated or saturated $C_8$-$C_{36}$ fatty acids suitable for forming the alkanolamine ester are oleic, erucic, eicosenic, stearic, linoleic, linolenic, palmitic, myristic, lauric, arachidic, behenic, arachidonic acids, and mixtures thereof.

Preferred fatty acids are mixtures of fatty acids derived from natural sources, such as fatty acids from tallow oil, olive oil, soybean oil, tall oil, sunflower oil, cottonseed oil, linseed oil, palm oil, rapeseed oil, coconut oil, corn oil, rice oil, bran oil, fish oils, peanut oil.

The most preferred fatty acid mixtures are those containing at least 60% wt of oleic acid.

The fatty acid esters of alkanolamines are readily prepared by esterification of the tertiary alkanolamines, possibly ethoxylated and/or propoxylated, with fatty acids.

The esterification is carried out at temperature from 100 to 300° C. The reaction may be catalyzed with acids, including, but not limited to, sulfuric acid, sulfonic acid, phosphorous acid, p-toluene sulfonic acid, methane sulfonic acid, alkylbenzene sulfonic acid, oxalic acid, hypophosphorous acid or an acceptable Lewis acid; typically, from 0.02 to 1% by weight, and more preferably, from 0.1 to 0.5% by weight of acid catalyst, based on the weight of the fatty acid, is employed.

Generally speaking, the anti-accretion agents of the invention are used in drilling fluids in an amount from 0.05 to 10% wt, more preferably from 0.5 to 5% wt.

In a preferred embodiment, the esters are the esters of a tri-alkanolamine of formula (I) wherein n=0, m=3, $R^2$ is $(CH_2CH(R^5)O)_s$—H with $R^5$=H, and s=1, with a mixture of fatty acids containing at least 60% wt of oleic acid (triethanolamine trioleate).

In a further preferred embodiment, esters are the esters of tri-alkanolamines of formula (I) wherein n=0, m=3, $R^2$ is $(CH_2CH(R^5)O)_s$—H with $R^5$=H, and s=3-7, with a mixture of fatty acids containing at least 60% wt of oleic acid.

Another example of useful anti-accretion agents according to the invention are the esters of a di-alkanolamine of formula (I) wherein n=1, $R^1$ is methyl, m=2, $R^2$ is $(CH_2CH(R^5)O)_s$—H with $R^5$=H, and s=1, with a mixture of fatty acids containing at least 60% wt of oleic acid.

The anti-accretion agents of the invention are generally rapidly dispersible in water-based muds; in case their viscosity is too high to allow direct addition to the water based muds, they can be diluted in advance, for example in mineral or vegetable oil, or emulsified in water.

The drilling fluids of the present invention may be formulated with brines. Useful salts for the preparation of brines include, but are not limited to, sodium, calcium, aluminum, magnesium, strontium, potassium and lithium salts of chlorides, carbonates, bromides, iodides, chlorates, bromates, nitrates, formates, phosphates, sulfates.

The brine may also comprise seawater.

The density of the drilling fluid is generally regulated by increasing the salt concentration of the brine and/or by the addition of specific weighting agents.

Suitable weighting agents are barite, siderite, galena, dolomite, ilmenite, hematite, iron oxides, calcium carbonates and the like.

The drilling fluids usually also contain rheology modifiers. Suitable rheology modifiers are gelling agents and viscosifiers, such as natural polymers or derivatives thereof, biopolymers, high molecular weight synthetic polymers, and the like.

Other conventional additives that may be contained in the drilling fluid are filtrate loss reducers (such as polyanionic cellulose), thinning agents and dispersants (such as lignosulfonates, tannins, polyacrylates and the like). It has been found that the anti-accretion agents of the invention do not modify the rheology of the drilling fluid, when used in their effective dosage.

Moreover they are generally not noxious to marine organisms. Triethanolamine trioleate, in particular, combines a favorable environmental profile with excellent anti-accretion properties.

Surprisingly, the anti-accretion agents of the invention have also proved to effectively act as shale inhibitors.

Examples are reported here below to illustrate the invention. They are not meant to limit the invention and should not be so interpreted.

EXAMPLE 1

Preparation of Triethanolamine Trioleate 2547 g of olein (containing 70% wt of oleic acid) and 453 g of triethanolamine are added under stirring in a reaction vessel equipped with heating, stirrer, thermometer, a system for the introduction of the reagents, such reaction vessel being connected to a cooler to collect the water of reaction and to a vacuum pump. While the vacuum pump applies a pressure of 60-80 mm Hg, the temperature is raised to 150° C. and maintained for three hours, then is increased to 170° C. till the acidity number drops below 15 mg/g of KOH. The reaction mixture is cooled down to 50-60° C. and the product (Additive 1) is obtained in liquid form (acidity number: 14.6 mg/g KOH).

EXAMPLE 2

Preparation of 9 Moles Ethoxylated Triethanolamine Trioleate.

1900 g of triethanolamine and 22 g of a 35% solution of potassium hydroxide are added under stirring in an alkoxylation autoclave. A vacuum of about 100 mm Hg is applied and the temperature is raised to 120° C. The mixture is maintained at 120° C. and 100 mm Hg for 30 minutes; a slowly addition of 5060 g of ethylene oxide is started; during the addition the pressure is maintained at about 3 bar. At the end of the addition the mixture is maintained at 120° C. for other 30 minutes then is cooled down to 50-60° C. and 9 moles ethoxylated triethanolamine is obtained in liquid form (amine number : 103 mg/g KOH)

1333.2 g of olein (containing 70% wt of oleic acid) and 866.8 g of the 9 moles ethoxylated triethanolamine are added under stirring in a reaction vessel equipped with heating, stirrer, thermometer, a system for the introduction of the reagents, such reaction vessel being connected to a cooler to collect the water of reaction.

The temperature is raised to 220° C. till the acidity number drops below 15 mg/g of KOH. The reaction mixture is cooled down to 50-60° C. and the product (Additive 2) is obtained in liquid from (acidity number: 14.2 mg/g KOH)

EXAMPLE 3 a) Preparation of a Test Drilling Fluid (Control)

A test fluid containing 50 wt % of water, 2 wt % of API Bentonite, 1 wt % of shale hydration inhibitor, 0.5 wt % of hydro-soluble polymer, 1,5 wt % of water soluble natural polymers, and 45 wt % of barite was prepared mixing up the components with a Silverson mixer at 6000 rpm (test fluid density: 1.65 kg/l).

The test fluid was divided into 350 ml samples.

A sample is used as such in the application tests (control).

b) Preparation of a Comparative Drilling Fluid (Comparison 1)

10 g of PHPA (partially hydrolyzed polyacrylamide) are added and mixed for 10 minutes in a 350 ml sample of the test fluid c) Preparation of a Comparative Drilling Fluid (Comparison 2)

30 g of potassium chloride are added and mixed for 10 minutes in a 350 ml sample of the test fluid d) Preparation of a drilling fluid comprising the additive of Example 1 (Fluid 1)

3 g of triethanolamine trioleate (Additive 1) are added and mixed for 10 minutes in a 350 ml sample of the test fluid e) Preparation of a drilling fluid comprising the additive of Example 2 (Fluid 2)

3 g of 9 moles ethoxylated triethanolamine trioleate (Additive 2) are added and mixed for 10 minutes in a 350 ml sample of the test fluid

EXAMPLE 4

Anti-accretion Test

The test described here below was carried out in order to evaluate the anti-accretion performance of the additives.

A reactive shale (Arne clay) was collected and dried overnight at 110° C. After cooling, the shale was broken down and sieved between 2 mm (10 mesh) in diameter and 4 mm (5 mesh) in diameter.

Hot roll cells were set up containing pre-weighed cylindrical steel bars with dimensions of 90 mm by 30 mm diameter and weight of approximately 400 g (in accordance with Method API RP 131-VII ed.—February 2004, §20.6). Each fluid to be tested is added to a cell until the fluid height equaled the top of the bar. 50 g of shale chips were then added to each hot roll cell and gently uniformly dispersed. The cells were capped and rolled for 30 minutes at room temperature in an oven equipped for maintaining the cells in constant rotation motion. Next, the cells were opened and the bars were carefully removed. The bars were allowed to drain for ten minutes, then the bars were weighed. The higher the weight of the bars, the lower the anti-accretion property of the tested additive. Results are reported in wt % of shale accreted on metal surface (accretion %).

| Example | Fluid description | accretion % |
|---|---|---|
| 3a) | control | >90 |
| 3b) | 10 g/350 ml PHPA | >80 |
| 3c) | 30 g/350 ml KCl | >70 |
| 3d) | 3 g/350 ml Additive 1 | 10 |
| 3e) | 3 g/350 ml Additive 2 | 20 |

EXAMPLE 5

Biodegradability in Seawater

The test was carried out according to the OECD Guideline for the testing of chemicals n° 306: Biodegradability in seawater (1992).

This study was performed to determine the biodegradation of triethanolamine trioleate (Additive 1) by exposing the substance to micro-organisms in natural seawater. Prior to the exposition, chemical oxygen demand for Additive 1 was measured. A certain amount of Additive 1 was added to seawater in closed bottles, and the oxygen content was measured once a week for four weeks. Biodegradation is given as the ratio of biological oxygen demand and chemical oxygen demand. After 28 days, Additive 1 was 52.6% degraded.

EXAMPLE 6

Algal Growth Inhibition Test

The test was carried out according the ISO protocol ISO/DP 10253—Water quality—Marine algal growth inhibition test with Skeletonema costatum and Phaeodactylum tricornutum.

A culture of the marine algae Skeletonema costatum was exposed to a series of test concentrations of Additive 1 In addition to a control test, concentrations ranging from 0.1 to 100.0 mg/l seawater were tested. The test lasted for 72 hours, and $EC_{50}$ (72 hours) was calculated to be higher than 10.0 mg/litre.

The invention claimed is:

1. A method for reducing accretion during oil and gas drilling operations, or in the subsequent completing or cementing operations of an oil or gas well, comprising drilling or completing an oil or gas well using a water-based drilling fluid comprising from 0.05 to 10% by weight of esters of alkanolamines with unsaturated, polyunsaturated or saturated C8-C36 monocarboxylic acids.

2. The method of claim 1 wherein the esters are esters of tertiary di- or tri-alkanolamines.

3. The method of claim 2 wherein the esters of tertiary di- or tri-alkanolamines have the general formula:

$$N(R1)n(R2)m(R3)o(R4)t \quad (I)$$

wherein:

R1 is a C1-C36 linear or branched alkyl group, n=0–1, and R2, R3, R4 are independently:

($CH_2CH(R5)O$)s-H with R5 is H or $CH_3$ and s=1–10; m+o+t=3−n; and m, o, and t=0–3.

4. The method of claim 3 wherein the esters are the esters of tertiary tri-alkanolamine of formula (I) wherein n=0, m=3, R2 is ($CH_2CH(R5)O$)s-H with R5=H, and s=1–5.

5. The method of claim 1 wherein the esters are esters of alkanolamines with mixtures of acids derived from substances selected from the group consisting of tallow oil, olive oil, soybean oil, tall oil, sunflower oil, cottonseed oil, linseed oil, palm oil, rapeseed oil, coconut oil, corn oil, rice oil, bran oil, fish oils, and peanut oil.

6. The method of claim 5 wherein the esters are esters of alkanolamines with mixtures of fatty acids containing at least 60% wt of oleic acid.

7. The method of claim 6 wherein the esters are the esters of a tri-alkanolamine of formula (I) wherein n=O, m=3, R2 is ($CH_2CH(R5)O$)s-H with R5=H, and s=1.

8. The method of claim 6 wherein the esters are the esters of tri-alkanolamines of formula (I) wherein n=O, m=3, R2 is ($CH_2CH(R5)O$)s-H with R5=H, and s=3–7.

9. The method of claim 6 wherein the esters are the esters of a di-alkanolamine of formula (I) wherein n=1, m=3, R2 is methyl, m=2, R2 is ($CH_2CH(R5)O$)s-H with R5=H, and s=1.

10. The method of claim 5 wherein the esters are present at a concentration of from 0.5 to 5 wt%.

* * * * *